Figure 1:
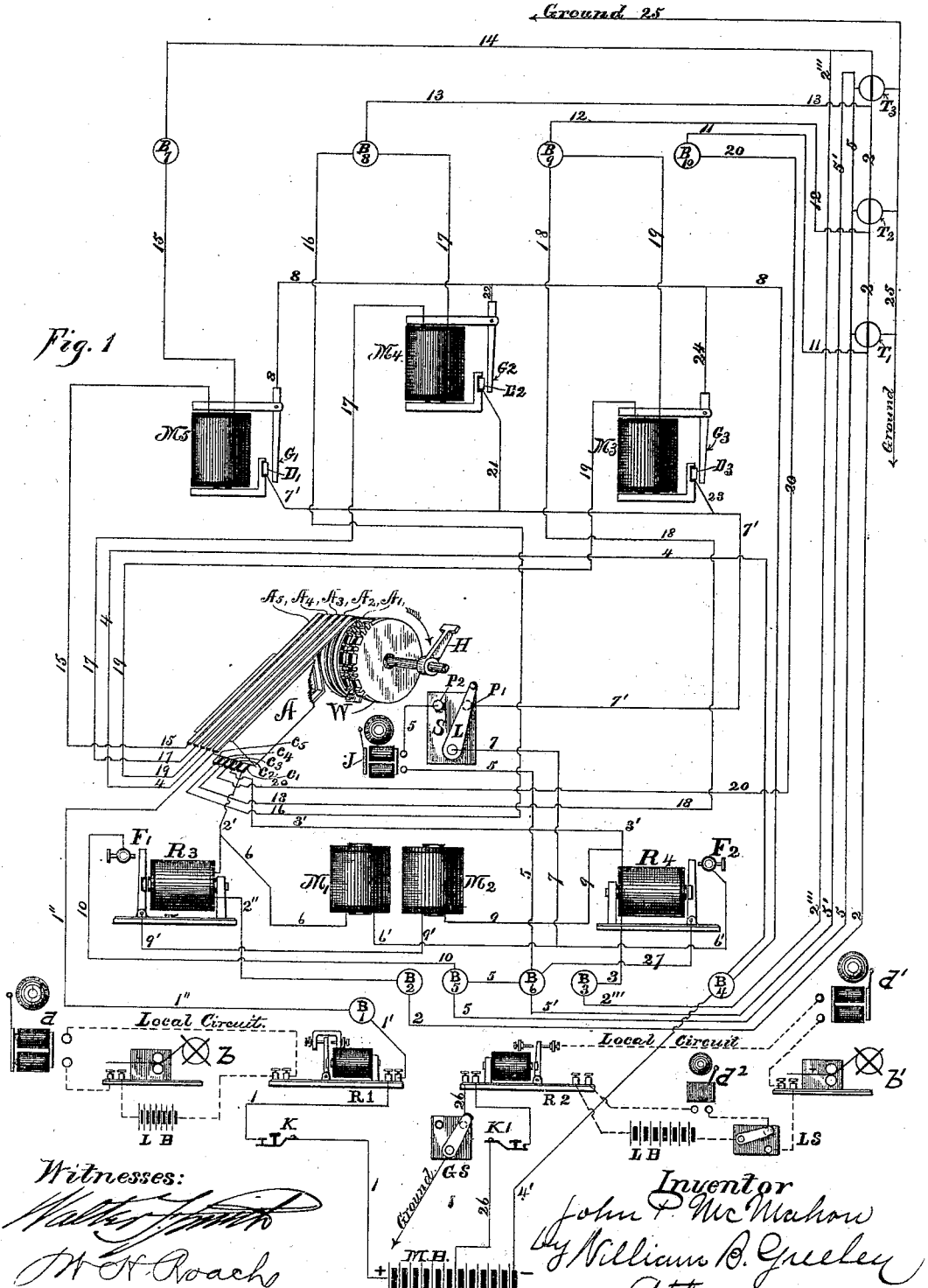

(No Model.) 5 Sheets—Sheet 1.

J. P. McMAHON.
AUXILIARY FIRE ALARM.

No. 416,483. Patented Dec. 3, 1889.

Witnesses:

Inventor
John P. McMahon
by William B. Greeley
Atty (No Model.) 5 Sheets—Sheet 2.

J. P. McMAHON.
AUXILIARY FIRE ALARM.

No. 416,483. Patented Dec. 3, 1889.

Witnesses:

Inventor.
John P. McMahon
by William B. Greeley
Atty (No Model.) 5 Sheets—Sheet 3.
J. P. McMAHON.
AUXILIARY FIRE ALARM.

No. 416,483. Patented Dec. 3, 1889.

Witnesses:

Inventor
John P. McMahon
by William B. Greeley
Atty (No Model.) 5 Sheets—Sheet 4.

J. P. McMAHON.
AUXILIARY FIRE ALARM.

No. 416,483. Patented Dec. 3, 1889.

Witnesses:

Inventor
John P. McMahon
by William B. Greeley
Atty (No Model.)  5 Sheets—Sheet 5.

J. P. McMAHON.
AUXILIARY FIRE ALARM.

No. 416,483.  Patented Dec. 3, 1889.

Witnesses:

Inventor
John P. McMahon
by William B. Greeley
Atty

UNITED STATES PATENT OFFICE.

JOHN P. McMAHON, OF BUFFALO, NEW YORK, ASSIGNOR TO THE McMAHON THERMOGRAPH COMPANY, OF JERSEY CITY, NEW JERSEY.

AUXILIARY FIRE-ALARM.

SPECIFICATION forming part of Letters Patent No. 416,483, dated December 3, 1889.

Application filed September 28, 1889. Serial No. 325,354. (No model.)

*To all whom it may concern:*

Be it known that I, JOHN P. MCMAHON, a citizen of the United States, residing in Buffalo, in the county of Erie and State of New York, have invented an Improvement in Auxiliary Fire-Alarms, of which the following description, in connection with the accompanying drawings, is a specification.

Like letters on the several figures of the drawings represent like parts.

My invention is embodied in the novel arrangement and construction of the circuits and apparatus for the transmission automatically of signals from a building or group of buildings to be protected to a central office, and for the reception and recording of said signals at the central office, all as hereinafter described and claimed.

The object of the invention is to provide simple and reliable means whereby an alarm will be given upon the breaking out of a fire in a building, both at the point where a fire occurs and at some distant point; to indicate the exact location of the fire by visual and audible signals at both points; to insure these things being done whether the line connecting the building or group of buildings with the central office is broken, grounded, or short-circuited, and whether the wires in the building are broken, grounded, or otherwise interrupted; to distinguish between fire-alarms and those caused by derangement of the wires and prevent false alarms, and to secure other advantages hereinafter referred to.

The improved system consists, mainly, of the following parts: first, a suitable battery which is included in a normally-closed metallic circuit, and with which is combined a normally-open grounded circuit on the same wire; second, a relay or other usual and suitable receiving-instrument on each circuit for receiving and recording signals; third, a signal box and indicator located at the building to be protected; fourth, thermostatic circuit-controllers; fifth, the system of wires connecting the thermostats with the signal-box and with a central office.

The battery used is preferably a gravity-battery and is included in a closed metallic circuit. Said circuit includes a relay or other suitable device for receiving signals and a key for interrupting the circuit. At the center of the battery a wire is attached. This wire is connected to another relay from which a wire leads to the lever of a button-switch, one contact of said switch being in connection with the earth.

The signal box and indicator comprise a transmitting-instrument, consisting of a motor or clock-train controlled by electro-magnets, a number of story-magnets which control the movement of a pointer for indicating the different stories or sections of a building and accomplish certain other results, and a break-wheel and circuit-breakers which are adapted to break the electric circuit and transmit a signal, the character of which is determined by the number of times the circuit is broken.

The motor employed consists of a train of gear-wheels operated by a spring. The second and fourth wheels have pins inserted in them, which engage with the free end of a lever the other end of which is connected with the armature of the controlling-magnets. When the controlling-magnets are energized, the armature is attracted and depresses the outer end of the pivoted lever, freeing it from its engagement with the second wheel of the motor and allowing it to rotate. Should the lever be depressed for a sufficient length of time to allow the fourth or slow-going wheel to make a complete revolution, the lever would engage with the pin on the face of said wheel and cause the motor to stop. The controlling-magnets are included in a normally-open circuit that is completed and closed by the action of the story-magnets on their being energized. The box also contains two small relays and a small switch, the objects of which will be shown hereinafter.

The break-wheel is mounted on the shaft of the second wheel of the motor, as is also a short arm, the use of which will be described later on. The circuit-breakers consist of a number of spring contact pieces or brushes mounted upon suitable insulation and resting against a number of contact-points that project through the insulation and serve to either break or complete the circuit, according as they may be in or out of contact with each other. The break-wheel consists of metal disks having upon their edges a number of projections so arranged as to lift the contact pieces or brushes and break the circuit a definite number of times. These disks are insulated from each other and from the shaft upon which they are mounted.

The story-magnets are mounted upon the face-plate of the box in such manner that when their armatures are attracted they will cause a rod, which is attached to the free end of the armature, to project through the face-plate and engage a pointer that is carried on the shaft of the motor in much the same manner as is the minute-hand of a clock.

The arm on the shaft of the break-wheel engages the lever of the small switch when the motor rotates the wheel, breaks the short circuit established by the story-magnet, and places the lever in connection with a contact-point, to which a wire leading to the open-contact thermostats is attached, and which completes the grounded circuit when a thermostat is operated. A bell is also included in this wire for the purpose of alarming the occupants of the building in case of fire.

The thermostatic circuit-controllers and the system of wiring will be referred to further herein.

Figure 2:
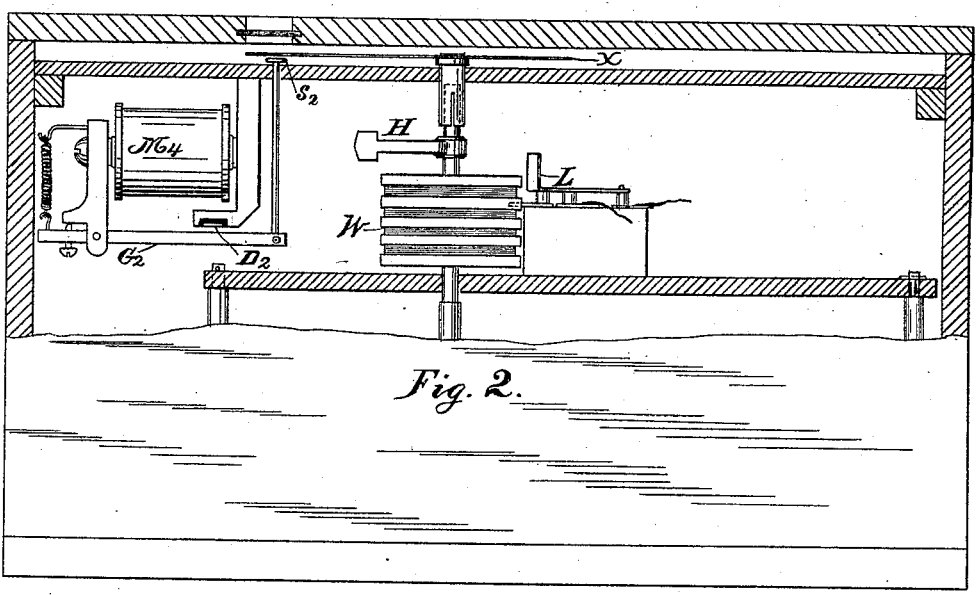
Figure 3:
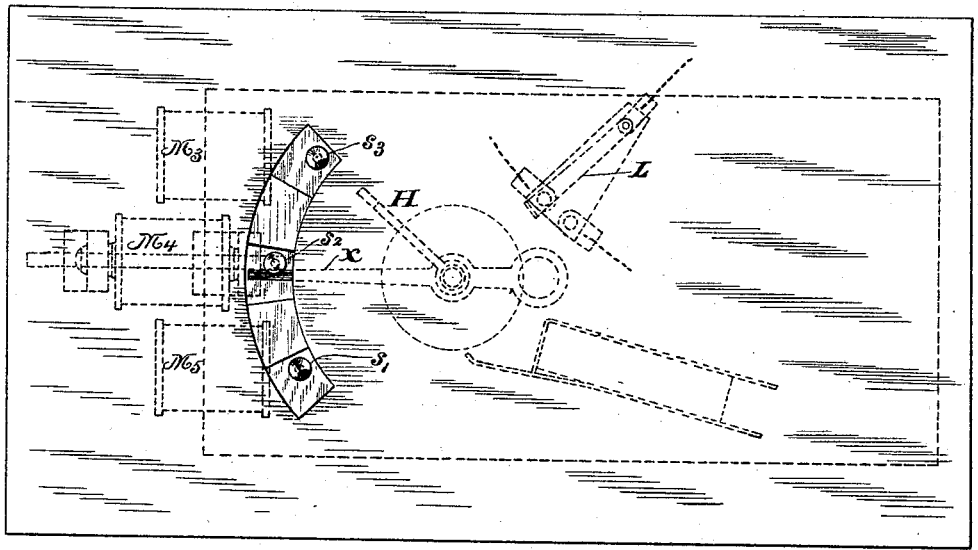
Figure 4:
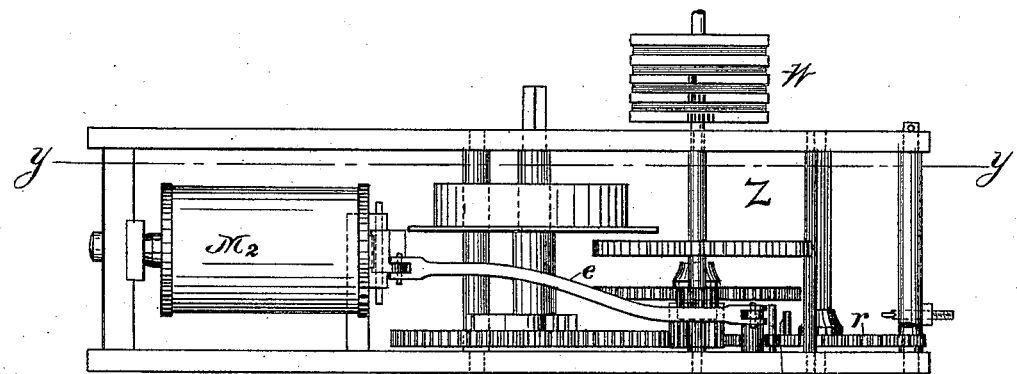
Figure 5:
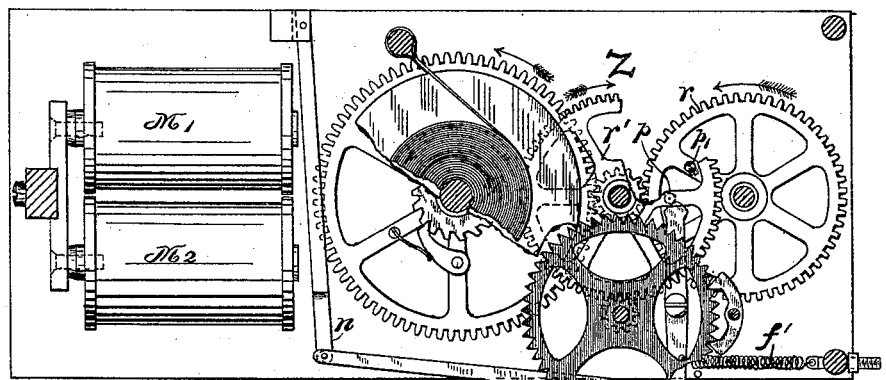
Figure 8:
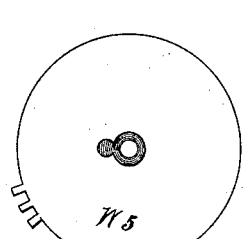
Figure 10:
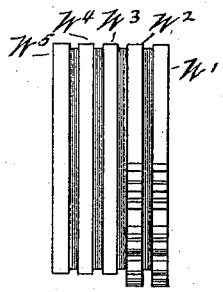
Figure 6:
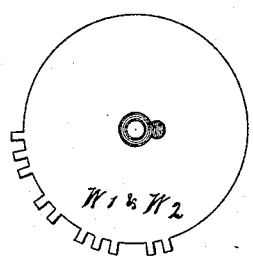
Figure 9:
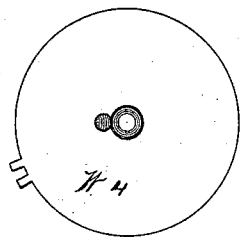
Figure 7:
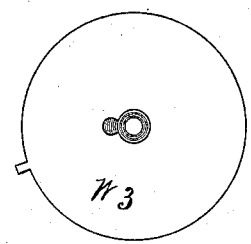
Figures 11, 12:
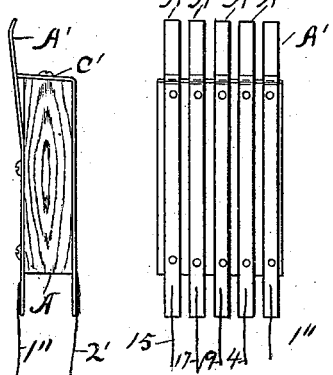
Figure 13:
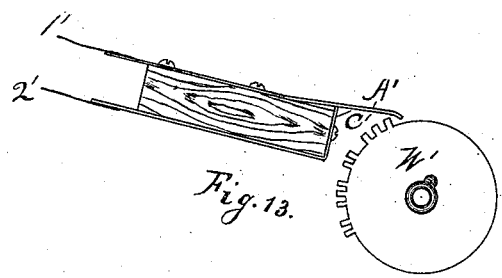
Figure 15:
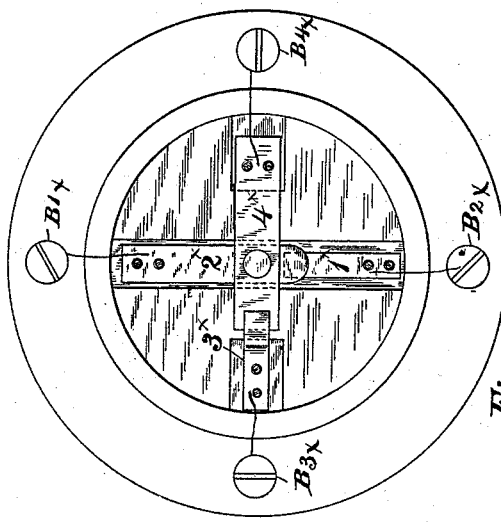
Figure 17:
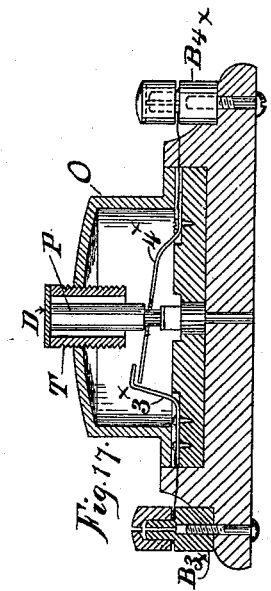
Figure 14:
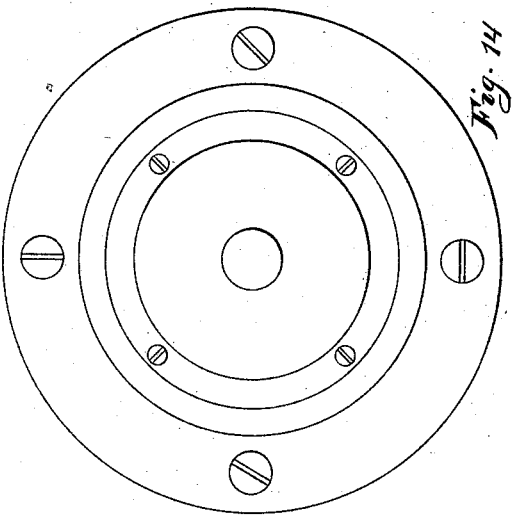
Figure 16:
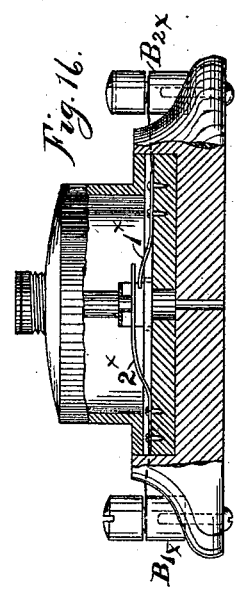

In the drawings, Figure 1 is a diagrammatic view of the system as a whole, showing the manner of wiring and connecting the various parts. Fig. 2 is a partly-sectional view of the signal-box, showing one of the story-magnets in its relation to the break-wheel and pointer. Fig. 3 is a face view of the signal-box, parts within the box being shown in dotted lines. Fig. 4 is an edge view of the motor. Fig. 5 is a sectional view of the same on the line $y\ y$ of Fig. 4, parts being broken away. Figs. 6, 7, 8, 9, and 10 are detail views of the break-wheel. Figs. 11 and 12 are detail views of the circuit-breaker. Fig. 13 is a detail view of the circuit-breaker in its relation to the break-wheel. Fig. 14 is a plan view of the double thermostat employed. Fig. 15 is a similar view of the same with a part of the casing removed, and Figs. 16 and 17 are vertical sectional views of the same on planes substantially at right angles one to the other.

The battery MB, which is the only battery employed in my system, is located at the central office. It is in a closed metallic circuit formed by a continuous wire from the battery to and through the building or buildings to be protected and the closed-contact thermostats therein and back again to the battery. With this closed metallic circuit is combined on the same wire an open ground-circuit, which is completed by the action of some one of the open-contact thermostats, as will be explained hereinafter. To provide for one ground for this open ground-circuit, a wire or branch 26 is run from the center of the battery in the central office to the ground. For convenience and for the purpose of testing this branch is run through a two-point switch GS, so that by turning the switch-button the earth connection can be made or broken at will. The switch is normally closed, thus grounding the battery in the middle.

The thermostats or heat-detectors are instruments which will cause a signal to be transmitted to the central office whenever the temperature of the room in which they are located exceeds the point at which they are set. They may be of any ordinary construction, and, as indicated above, are of two classes, those of the one class operating to open the metallic circuit and those of the other class to close the open ground-circuit, thus sending two distinct signals. It is evident that these two forms might be combined in one, and I have shown a desirable form of such a double thermostat in Figs. 14, 15, 16, and 17.

Upon a suitable insulated base four spring-metal strips are mounted. Strips $1^\times$ and $2^\times$ are connected to binding-posts, to which are attached the terminals of the main building circuit-wire 2, Fig. 1. Strips $1^\times$ and $2^\times$ are represented in Fig. 16 as slightly separated for the sake of clearness, but are in electrical contact when the instrument is in its normal condition, (that is, when closed ready to send a fire-alarm.) They complete the main metallic circuit from $B'^\times$ to $B^{2\times}$, and are held in contact with each other by the insulated post P. The strips $3^\times$ and $4^\times$ are connected to binding-posts $B^{3\times}$ and $B^{4\times}$, of which $B^{3\times}$ is attached to a wire leading to earth, (wire 25, Fig. 1.) $B^{4\times}$ is attached to a wire which leads to signal-box, and is there connected, as shown in Fig. 1, (wire 5.) These strips are kept apart by the post P when the thermostat is closed. The springs are inclosed in a stout metal case O, through which projects a tube T, which is screwed into the case, and whose outer or exposed end is sealed by a thin disk of brass D, which is soldered to the body of the tube with solder which fuses at a degree of temperature previously determined. The post P rests upon this disk, and, on the tubes being screwed into position, forces the springs $1^\times$ and $2^\times$ together, thus closing the metallic circuit through the thermostat, and at the same time separating springs $3^\times$ and $4^\times$, holding them apart, (thus breaking the contact between wire 5 and wire 25, Fig. 1.) Should a fire occur near one of the thermostats, the temperature would be raised above the fusing-point of the solder, which is preferably about 160° Fahrenheit, and the disk would be freed from the tube, post P would be released, springs $3^\times$ and $4^\times$ would form a connection, and springs $1^\times$ and $2^\times$ would separate. Wire 2 would be interrupted, wire 5 would be connected to earth, and a fire-signal would be transmitted to the central office by the signal-box located in the building.

I make no claim herein to the construction of the thermostat, as the same forms the subject-matter of another application filed October 7, 1889, Serial No. 326,181.

The receiving-instruments at the central office may consist of a relay R' on the metallic circuit, with a register and a bell, and a relay R², included in the ground branch from the battery, with a register and a bell. An extra bell is also used on the local circuit of the relay R². The relay used in the closed circuit may be of a standard pattern, and preferably is so arranged that when the circuit is broken the armature will be released and will close a local circuit, which includes the register $b$ and bell $d$. This closing of the local circuit will cause the register to start and make a mark on a paper tape corresponding to the length of time the local circuit is closed. On the main circuit being closed the relay-armature will be attracted, the local circuit broken, and the register stopped. In like manner each time the local circuit is closed one stroke is given on the bell. The instruments on the ground-circuit preferably differ from those just referred to in this respect: The relay has contact points, which close the local circuit when the armature is either open or closed; but the circuit from the back contact of the relay is broken by a small switch LS. The back contact of the relay is in circuit with the register $b'$ and bell $d'$, and the front contact with the extra bell $d^2$, which latter is of the class known as "vibrating" bells. These receiving-instruments are of ordinary construction and arrangement and form no part of my invention; hence they are not described or shown more in detail.

It will be evident that if a ground occur on the line, either by the action of one of the open-contact thermostats or from an accidental ground, the armature or relay R² would be attracted and close the local circuit and give an audible signal upon a bell, which would call the attention of the operator to the fact that the circuit had been grounded outside of the central office. Should this signal be received without a previous signal on the metallic-circuit instrument, it would indicate a foreign ground—that is, one caused by accident to the line-wire. All that would be necessary to do to clear the line for the reception of signals on the metallic circuit would be to open the ground-connection in the central office by means of the switch GS. Signals would then be received on the metallic-circuit instrument R' from any building on the line until the foreign ground was located and removed. Should a thermostat close the ground-circuit, it would close it through both halves of the battery and on the right and left legs of the circuit; but as the signal-box, by means hereinafter described, breaks the circuit on both sides of the thermostat ground, the relay R² responds freely to each break caused by the circuit-breaker of the signal-box, and the same signal is received as that received on the metallic-circuit instrument R'. Should a break occur on the main line, the buildings are still protected, for as soon as a thermostat operates it closes the ground-circuit through the battery and the line to the central office on which it may be connected. This would start the signal-box, and a signal would be received on the relay R², showing that a thermostat had opened at the building indicated. It will also be seen that every time the main circuit is broken by the rotation of the break-wheel of the signal-box, as hereinafter described, the relay-armatures are released and the local circuit is closed. Upon the main circuit closing the armatures are again attracted, and the local circuit is broken and a signal is received corresponding to the number of times the main circuit is broken and closed by the signal-box. The local circuit of the register on the ground-circuit is normally opened at the small switch mentioned above, and the circuit is through the vibrating bell. On a ground being thrown on the line the armature of relay R² is attracted and closes the local circuit through the vibrating bell, which rings continuously until shut off by the operator at the central office. This is done by moving the small switch LS, and in doing this the circuit to the register is completed for the reception of signals.

The signal box and indicator is an instrument which is placed at the building to be protected. It contains a clock-train Z, run by a spring; a break-wheel W, carried on the shaft of one of the wheels of the train; a circuit-breaker A, of as many members as may be required by the size of the building; two magnets M' M², to release and control the movement of the clock-train, and a number of magnets M³ M⁴ M⁵, to indicate the stories or floors on which the fire may occur, and two small relays R³ R⁴. The shaft of the break-wheel carries a short arm H, which engages the lever L of a small switch S and shifts it from one contact-point P' to another P² when the wheel makes a rotation. The construction, arrangement, and operation of these parts will be explained in detail hereinafter.

The wiring of the buildings necessary to connect the thermostats with each other and with the signal box and indicator is done in the following manner: The left-hand leg of the circuit (wire 1, Fig. 1) is brought to binding-post B' of box, where it connects with wires and other appliances and connects with binding-post B². From there wire 2, Fig. 1, is run to all the floors of the building and is carried through every room on the floor at the ceiling. At proper intervals the wire is cut and connected to thermostats, which when closed complete it. After being carried through all the various floors and rooms of the building it is carried back to the box, which it enters at B³, and is again connected by a system of brushes and wires with the right-hand leg of the circuit, (wire 4', Fig. 1,) thus making a complete circuit of the building. This wire is the main-building circuit. There are also two others, wire 5 and wire 25.

Wire 5 is carried from the box to every open-contact thermostat in the building and is stripped of its insulation and inserted in a binding-post, as shown in Fig. 16. It is thus in metallic connection with spring $4^×$, Fig. 16, of every open-contact thermostat and ready to make connection with the earth on a thermostat being operated. In order that this wire may not be disabled by a break, it is carried back to the signal-box after making a complete circuit of the building, thus giving two routes to the current in case of a break on this wire. It also affords an easy method for the inspector to test the condition of this wire from the box without going through the entire building. Wire 25, Fig. 1, is also run through the building and is connected to spring $3^×$, Fig. 17, of every open-contact thermostat. It is connected to earth at each end and at as many intermediate points as may be convenient. This is done in order that there may be no failure to work because of an accidental break in the wire.

I have indicated but three double thermostats $T'$ $T^2$ $T^3$, one for each floor; but it is to be understood that each one of these represents a group located on a floor or in a room.

The devices thus far described provide for the attainment of a portion only of the objects of the invention. In order to guard against derangement of the system which might render it inoperative, to indicate exactly the location of a fire, to distinguish between trouble-alarms and fire-alarms, to prevent false-alarms, &c., certain details of construction and arrangement are necessary and will now be described.

The circuit-breaker A consists of a number of spring contact pieces or brushes $A'$ $A^2$ $A^3$ $A^4$ $A^5$, mounted upon suitable insulation in the signal-box, and resting against a number of contact-points $C'$ $C^2$ $C^3$ $C^4$ $C^5$, that project above the insulation. These brushes and points serve to break or complete the circuit, according as they may be in or out of contact. The spring contact-pieces are raised out of contact with the points by projections on the break-wheel.

Referring now to Fig. 1, it will be seen that the movements and actions of the electric currents are as follows: Starting at the + pole of the battery MB, the current follows wire 1, key K, passes through the coils of relay $R'$ by wire $1'$ to binding-post $B'$, wire $1''$ to brush $A'$ of circuit-breaker A, to contact $C'$, wire $2'$ to coils of relay $R^3$, by $2''$ to binding-post $B^2$, to wire 2, which is carried through all the rooms of the building, through the thermostats, and by wire $2'''$ to binding-post $B^3$, wire 3 to coils of relay $R^4$, by wire $3'$ to contact $C^2$ of breaker A, brush $A^2$, wire 4 to binding-post $B^4$, and by wire $4'$ to another building or back to − pole of battery MB. This completes the main metallic circuit.

Should a thermostat be operated—say $T'$ on the first floor—the circuit would be broken, and to obviate this, and at the same time indicate which story the thermostat has opened on, extra wires, known as "taps," are connected to wire 2 where it enters the floor, and are led to the signal-box and back again to wire 2 where it enters the floor next above. This, with the magnet in the signal-box, forms a shunt around the break and maintains the circuit intact, while it causes the signal-box to transmit a signal to central office. This is done as follows: At the point where wire $2'$ leaves contact $C'$ of breaker A wire 6 is attached, which leads to the coils of magnet $M'$, which controls the mechanism of the box by wire $6'$, wire 7, lever L of switch S, contact $P'$, wire $7'$, wire 23 to an insulated contact-point $D^3$, which is mounted on the frame of magnet $M^3$. The armature $G^3$ of magnet $M^3$, being attracted by the current through its coils, touches $D^3$, and as it is connected with wire 8 by a short wire 24 it completes a short circuit through the coils of the starting-magnet $M'$ from the contact $C'$ to the outgoing main line at $B^4$, thus energizing $M'$ and attracting its armature, which releases the clock-train and causes the break-wheel W to rotate in the direction shown by the arrow. This break-wheel consists of a number of metal disks corresponding with the number of stories of the building in which it is located, in addition to two disks for the main circuit. They are separated from each other and from the shaft on which they are mounted by suitable insulating material. The outer disks $W'$ and $W^2$, Figs. 6 and 10, have projections upon their edges, as shown. These projections are so arranged as to form, for example, the number 3 2, which is repeated. Disks $W^3$, $W^4$, and $W^5$, Figs. 7, 8, 9, and 10, have, respectively, one, two, and three such projections, and are so arranged that a space is left between them and the projections on disks 1 and 2. The break-wheel W in rotating engages the brushes of the circuit-breaker A and lifts them off the contact-points, thus breaking the main circuit and causing a signal to be sent to the central office. The signal sent would in this instance be 32 32-1, for the reason that as the break occurs on the first floor the circuit is as follows: Starting at the + pole of MB, the current passes by wire 1, key K, relay $R'$, wire $1'$, post $B'$, wire $1''$, brush $A'$ of breaker A, contact $C'$, wire $2'$, relay $R^3$, wire $2''$, post $B^2$, wire 2. As the wire is broken at $T'$, the course of the current would be by wire 11, post B 10, wire 20, contact $C^3$, brush $A^3$, wire 19, magnet $M^3$, wire 19, post $B^9$, wire 12, to wire 2, where it enters second story, and by wire 2, wire $2'''$, post $B^3$, wire 3, relay $R^4$, wire $3'$, contact $C^2$, brush $A^2$, wire 4, post $B^4$, and wire $4'$ to battery MB. As the wheel W in rotating lifts the brushes A from contacts C, the circuit is broken. As current is on the shunt which includes brush $A^3$, magnet $M^3$, and contact $C^3$, the circuit will be broken when the projection on disk $W^3$ passes brush $A^3$, and as but one projection is on this disk but one signal is sent. Owing to the high resistance of the shunts, no current passes over them while the main circuit is intact, and while the brushes of all the story-shunts are lifted by the wheel W, yet as current is sent only on the first-floor shunt a signal is sent from that floor only. As current is always on brushes A' and A², a signal is sent whenever a projection on W passes the brushes. Thus, as stated, the signal received at the central office would be 32-32-1. This would indicate that the main line had been broken on the first floor of the building, in which box 32 was located; but as this signal might be caused by the accidental breaking of the line, as well as by the action of the thermostat when operated by heat, it is necessary to provide means for distinguishing between a signal caused by a break and one caused by a thermostat. By referring to Fig. 1 the manner in which this is done can be seen. The mechanism of the signal-box is held in check by a lever $f$, Fig. 5, which is connected by a rod $e$ to the armature of magnets M' M². This lever is held engaged with a pin $p$ in one of the wheels $r'$ of the clock-train and prevents the break-wheel from rotating until it is drawn away by magnet M'. When the circuit of M' is broken, its armature is released, and the lever, through the action of a spring $f'$, again engages the wheel $r'$, stopping the movement. The line having been broken on the first floor, the armature of magnet M³ completes the circuit of magnet M', releases the box-movement, and starts wheel W rotating. The shaft of wheel W carries a short arm H, as will be seen by referring to Figs. 1, 2, and 3, which arm, in passing, engages the lever L of switch S, Fig. 1, and moves it from contact P' to contact P², thus breaking the circuit of magnet M', releasing its armature, and stopping the movement on the completion of one revolution. The magnet M' is now in electrical contact with wire 5 through lever L of switch S and contact P². If the break was caused by an accident to wire 2, no further revolution of the wheel W takes place, and the signal sent is understood to indicate a break on the first floor of 32. If, on the contrary, the thermostat has been operated by undue heat, wire 5 is thrown into contact with wire 25, and so with the earth, and completes the open ground-circuit from the ground and switch GS in the central office, through relay R², key K', wire 26, half of MB, wire 1, key K, relay R', wire 1', post B', wire 1'', brush A', contact C', wire 2', wire 6, magnet M', wire 6', wire 7, lever L of switch S, contact P², wire 5, bell J, wire 5, post B⁵, wire 5, spring 4× of thermostat T', spring 3×, wire 25, to earth. The thermostat having completed the open ground-circuit, the armature of relay R² is attracted and a bell is rung in the central office. The operator throws the local switch LS, already referred to, which connects the register with R². As it has been thought unsafe to rely on only one round of signals from the box, the movement is so arranged that the armature of M', being held attracted by the current of the ground-circuit passing through its coils, as explained, the lever $f$, Fig. 5, which is connected to the armature $n$, and which works on a pivot, engages a second wheel $r$ of the clock-train. This wheel is a slow-going one, and only makes one revolution while the wheel $r'$, on whose shaft the break-wheel W is mounted, makes four. Thus three additional rounds of signals are received before the slow wheel is engaged by the lever of armature $n$ and the movement stopped. As the brushes A' and A² break the circuit on both sides of the ground at T', the relay R² responds freely to each break, and the same signal is received as upon R'. Thus it will be seen that four rounds of the box will be received upon two different instruments in case of fire and only one round received upon one instrument in case of a break.

Automatic fire-alarm systems are liable to accidents, and the best system is that one which is least liable to be rendered inoperative by an accident. That the possibility of being rendered inoperative by an accident to any of its parts is reduced to a minimum in this system can be shown. If the metallic circuit be broken, the open ground-circuit is still intact and ready to transmit a fire-signal. Should the circuit be grounded by throwing the switch GS in the central office to the left, the circuit is cleared for the reception of signals on the metallic circuit, and should a fire occur in any of the buildings while the foreign ground was still on the circuit a distinct signal for fire would still be received, for the thermostat would complete the circuit from the foreign ground through the coils of magnet M' and four rounds of the box be received on R', instead of one round, which would be the case if caused by a break in the building-wire. In case of a break in the main line the buildings would be still protected, as the thermostat on being operated by heat would close the ground-circuit through the coils of either magnet M' or magnet M².

Suppose the break occurred on the left leg of the circuit or wire 1. The relays R³ and R⁴ would be demagnetized and their armatures would fall away from the cores and rest against the stops F' and F². Those stops are connected as follows: Stop F' with wire 10, which connects with wire 5 at B⁵, Fig. 1. The armature of relay R³ is connected with magnet M² by wire 9', and wire 9 connects magnet M² with wire 3'. Should the thermostat complete the circuit, the course of the current would be as follows: Ground and switch GS, wire 26, relay R², key K', half of MB, wire 4', post B⁴, wire 4, brush A², contact C², wire 3', wire 9, magnet M², wire 9', armature of relay R³, stop F', wire 10, post B⁵, wire 5, spring 4× of thermostat T', spring 3× of the same, wire 25 to earth. The armature of M², which is the same one acted on by M', would be attracted and four rounds of the box be received on relay R² at the central office. Should the break occur on the right leg or wire 4', the course of the current would be reversed. In that event the circuit would be ground and switch GS, wire 26, relay R², key K', wire 26, the left half of battery MB, wire 1, key K, relay R', wire 1', post B', wire 1'', brush A', contact C', wire 2', wire 6, magnet M', wire 6', stop F², armature of relay R⁴, wire 27, post B⁶, wire 5', spring 4ˣ of thermostat T', spring 3, wire 25 to earth, as before.

Should a line-wire break in the building, thermostats on the floor where the break occurred would be operative on the ground-circuit, and all others would be operative on both circuits. One round of the box would be received at the central office and the floor-signal would indicate the locality of the break. As the thermostats are connected by a continuous wire from signal-box through the building back again to box, a break would not disable that wire, as there would still be one route open for the passage of current. So with the ground-wire which extends all through the building and is grounded at both ends. Any other accident occurring would be indicated at the central office by special signals—as, for instance, a break on main line would release the armature of R'. This would close the local circuit on its register and cause a long continuous mark to be printed on its tape. So if a ground occurred on the main line relay R² would be energized and its armature attracted, which would close the local circuit of the vibrating bell and cause it to ring continuously until shut off by the operator at the central office.

Should a building be short-circuited and a fire occur in it, the thermostat would ground the circuit, relay R² would close and start the bell, and on pressing a key K, Fig. 1, a fire-alarm would be received the same as if main line were broken.

It will be understood that it will be the duty of the operator, whenever a ground-signal is received, to open his key, leaving it open for a short time before moving switch GS to clear the circuit. The story-magnets also serve as a local indicator, showing the floor on which the fire occurs at the building where the box is located, as well as at the central office. Figs. 2 and 3 show its construction.

The magnet is mounted on the face-plate of the box, and when its armature is attracted causes the rod S², which is attached to the free end of the armature, to project beyond the plate. The outer end of this rod has a shoulder projecting, which engages a pointer $x$, Fig. 3, that is carried on the shaft of wheel W. This pointer is fastened to the shaft in the same manner that the minute-hand of a clock is, and travels with the shaft until the projecting rod S² is met, when its further progress is stopped and it indicates the story by a number which is painted on the face-plate at the point where the hand has been stopped.

A bell J is included in wire 5, as shown in Fig. 1. When the ground-circuit is completed by a thermostat, the magnets of this bell are energized and it responds to each break of the circuit caused by the wheel W passing the brushes of the circuit-breaker A. The bell can also be rung by breaking the circuit at the central office by depressing key K', and be rung as long as desired, thus warning the occupants of the building that a fire has occurred. Bells can also be placed at as many points as may be desired in the building and included in this wire. This bell J will ring only when the ground-circuit has been completed by a thermostat.

Having thus described the working and construction of the various parts, it will be seen that the system cannot be disabled by any of the ordinary accidents to which wire systems are subject. It combines all the advantages of both open and closed circuits, metallic and ground. All of its parts are under constant test. An accident is at once made known at the central office. The machinery used is simple and effective. The batteries are all massed in one place, thus lessening the cost of maintenance, as well as affording means for close supervision. No local batteries are used, thus doing away with an endless amount of trouble and expense, as well as the risk of failure to operate at critical moments. The system is always ready to work, and it is reliable, its parts being as few and simple as possible. It will distinguish between an alarm caused by trouble and a fire-alarm. It will indicate the exact location of the fire.

The thermostats described are reliable and easily repaired. In case of having been used, all that is necessary is to unscrew the tube and replace it with another, and as the electrical contacts are inclosed in a dust-proof case and protected from injury trouble from that source is obviated.

The sensitive solder which fastens the disk to the tube can be made to fuse at any desired degree of temperature. Although 160° Fahrenheit has been found to be most suitable for the greatest number of buildings, still cases occur where higher temperatures exist, and the fusing-point of the thermostat must be increased to correspond.

I do not herein lay claim to the broad combination of a metallic circuit, a series of thermostats, a series of shunts with circuit-closing magnets therein, and a controlling-magnet for a transmitter operated by the circuit-closing magnets, nor to the combination therewith of an indicator operated by the circuit-closing means.

I claim—

1. The combination of a closed metallic circuit, including a thermostat, a motor, a controlling-magnet for said motor, a tap-wire from said circuit on one side of said thermostat and returning to said circuit on the other side of said thermostat and including a magnet, contact-points carried by said magnet and its armature, electrical connections from said contact-points to said controlling-magnet, a ground branch from said circuit, and a second ground branch including a thermostat, whereby said controlling-magnet may be further energized, as and for the purpose described.

2. The combination of a closed metallic circuit, including a thermostat, a motor, a controlling-magnet for said motor, a tap-wire from said circuit on one side of said thermostat and returning to said circuit on the other side of said thermostat and including a magnet, contact-points carried by said magnet and its armature, a branch from one leg of said circuit to said controlling-magnet and to one of said contact-points, and a second branch from the other leg of said circuit to the other of said contact-points, a ground branch from said circuit and a second ground branch including a thermostat, whereby said controlling-magnet may be further energized, as and for the purpose described.

3. The combination of a normally-closed metallic circuit, a battery and thermostat therein, a ground branch from said battery, a motor, a controlling-magnet for said motor, a tap-wire from said circuit on one side of said thermostat and returning to said circuit on the other side of said thermostat and including a magnet, contact-points carried by said magnet and its armature, electrical connections from said contact-points to said controlling-magnet, and a second ground branch from the metallic circuit, including a thermostat, whereby said controlling-magnet may be further energized, as and for the purpose described.

4. The combination of a closed metallic circuit, including a thermostat and a characteristic circuit-breaker, a second characteristic circuit-breaker insulated from the first, a motor for said circuit-breakers, a controlling-magnet, a tap-wire from said circuit on one side of said thermostat and returning to said circuit on the other side of said thermostat and including a magnet and said second circuit-breaker, contact-points carried by said magnet and its armature, a branch from one leg of said circuit to said controlling-magnet and to one of said contact-points, and a second branch from the other leg of said circuit to the other of said contact-points, as and for the purpose described.

5. The combination of a closed metallic circuit, including a thermostat, a characteristic circuit-breaking device, and a receiving-instrument, a second characteristic circuit-breaking device insulated from the first, a motor for said circuit-breaking devices, a controlling-magnet, a tap-wire from said circuit on one side of said thermostat and returning to said circuit on the other side of said thermostat and including a magnet and said second circuit-breaking device, contact-points carried by said magnet and its armature, a branch from one leg of said circuit to said controlling-magnet and to one of said contact-points, and a second branch from the other leg of said circuit to the other of said contact-points, as and for the purpose described.

6. The combination of a closed metallic circuit, including a series of thermostats, a series of circuit-breaking devices, and a receiving-instrument, a series of tap-wires, each extending from said circuit on one side of a group of thermostats and returning to said circuit on the other side of said group of thermostats and each including a magnet and one of said circuit-breaking devices, a motor for said circuit-breaking devices, a controlling-magnet, contact-points carried by each of the magnets in the tap-wires and its armature, a branch from one leg of said circuit to the controlling-magnet and to one of the contact-points, and a second branch from the other leg of said circuit to the other of said contact-points.

7. The combination of a closed metallic circuit, including a thermostat, a tap-wire from said circuit on one side of said thermostat, including a magnet, and returning to said circuit on the other side of said thermostat, contact-points carried by said magnet and its armature, a motor, a controlling-magnet therefor, electrical connections from said contact-points to said controlling-magnet, including a switch, means whereby said motor may open said switch, a ground branch, a contact-point upon which said switch is moved, and a second ground branch from said contact-point, whereby the controlling-magnet may be demagnetized and then further energized, as and for the purpose described.

8. The combination of a closed metallic circuit, including a thermostat, a tap-wire from said circuit on one side of said thermostat, including a magnet, and returning to said circuit on the other side of said thermostat, contact-points carried by said magnet and its armature, a motor, a controlling-magnet therefor, a branch from one leg of said circuit to said controlling-magnet and to one of said contact-points and containing a switch, a second branch from the other leg of said circuit to the other of said contact-points, means whereby said motor may open said switch, a ground branch, a contact-point upon which said switch is moved, and a second ground branch from said contact-point, as and for the purpose described.

9. The combination of a normally-closed metallic circuit, a battery and thermostat therein, a ground branch from said battery, a shunt around said thermostat, including a magnet, a motor, a controlling-magnet, contact-points carried by said first-named magnet and its armature, a branch from one leg of said circuit to said controlling-magnet and to one of said contact-points and including a switch, a second branch from the other leg of said circuit to the other of said contact-points, means carried by said motor and adapted to move said switch, a contact-point upon which the switch is moved, and a normally-open branch from said last-named contact-point to the ground, including a thermostat, as and for the purpose described.

10. The combination of a normally-closed metallic circuit, a battery, receiving-instrument and thermostat therein, a ground branch from said battery, including a receiving-instrument, a shunt around said thermostat, including a magnet, a circuit-breaking device in said closed circuit, a motor, a controlling-magnet, contact-points carried by said first-named magnet and its armature, a branch from one leg of said circuit to said controlling-magnet and to one of said contact-points and including a switch, a second branch from the other leg of said circuit to the other of said contact-points, means carried by said motor and adapted to move said switch, a contact-point upon which the switch is moved, and a normally-open branch from said last-named contact-point to the ground, including a thermostat, as and for the purpose described.

11. The combination of a normally-closed metallic circuit, a battery, a receiving-instrument, and a series of thermostats in said circuit, a ground branch from said battery, including a receiving-instrument, a series of circuit-breaking devices, a series of shunts, one around each group of thermostats and each including a magnet and one of said circuit-breaking devices, a motor, a controlling-magnet, contact-points carried by each of said first-named magnets and its armature, a branch from one leg of said circuit to said controlling-magnet and to one of the contact-points of each of said first-named magnets and including a switch, a second branch from the other leg of said circuit to the other of said contact-points of each of said first-named magnets, means carried by said motor and adapted to move said switch, a contact-point upon which the switch is moved, and a normally-open branch from said last-named contact-point to the ground, including a thermostat, as and for the purpose described.

12. The combination of a closed metallic circuit, including a battery, a receiving-instrument, a thermostat, and a series of characteristic circuit-breakers insulated from one another, a shunt around said thermostat and including one of said circuit-breakers, a branch from said battery to the ground, including a receiving-instrument, and a second branch from said circuit between the circuit-breakers to the ground, normally open and including a thermostat, as and for the purpose described.

13. The combination of a closed metallic circuit, including a receiving-instrument and a battery, a branch from said battery to the ground, including a receiving-instrument, a plurality of characteristic circuit-breakers in said circuit, a motor therefor, a second branch from said circuit between the circuit-breakers to the ground, normally open and including a controlling-magnet for said motor, and a thermostat for closing said last-named branch, as and for the purpose described.

14. The combination of a closed metallic circuit, including a battery, a branch from the battery to the ground, including a receiving-instrument, a normally-open branch from said circuit to the ground, including a thermostat, a circuit-breaker, a motor, a controlling-magnet, a relay in one leg of said metallic circuit, and contact-points adapted to be closed when the circuit is broken, connections from one contact-point to the controlling-magnet, to the circuit-breaker, and to the other leg of said circuit, and connections from the other contact-point to said normally-open ground branch, as and for the purpose described.

15. The combination of a closed metallic circuit, including a battery, a branch from the battery to the ground, including a receiving-instrument, a normally-open branch from the circuit to the ground, including a thermostat, a circuit-breaker, a motor, two controlling-magnets therefor, two relays, one in each leg of said metallic circuit, and contact-points adapted to be closed when the circuit is broken, connections from one contact-point of the first relay to one controlling-magnet, to the circuit-breaker, and to the opposite leg of the circuit, and similar connections from one contact-point of the other relay to the other controlling-magnet, to the circuit-breaker, to the opposite leg of the circuit, and connections from the other contact-points to said normally-open branch, as and for the purpose described.

16. The combination of a normally-closed metallic circuit, a receiving-instrument, and a thermostat therein, a normally-open ground branch from said circuit, a thermostat, and an alarm therein, a second ground branch from said circuit and a receiving-instrument therein, and a characteristic circuit-breaker in each leg of said circuit on either side of the connection therewith of the second ground branch, whereby the same characteristic signal is received upon both receiving-instruments and upon the alarm, as and for the purpose described.

17. The combination of a closed metallic circuit, including a thermostat, a motor, an indicator frictionally connected with said motor, a tap-wire from said circuit on one side of said thermostat and returning to said circuit on the other side of said thermostat and including a magnet, and a rod connected to the armature of said magnet and adapted to be moved thereby into the path of said indicator, as and for the purpose described.

18. The combination of a closed metallic circuit, including a thermostat, a receiving-instrument, and a characteristic circuit-breaker, a tap-wire from said circuit on one side of said thermostat and returning to said circuit on the other side of said thermostat and including a second characteristic circuit-breaker, and a motor for said circuit-breakers, as and for the purpose described.

19. The combination of a closed metallic circuit, including a thermostat, a receiving-instrument, and a characteristic circuit-breaker, a tap-wire from said circuit on one side of said thermostat and returning to said circuit on the other side of said thermostat and including a magnet and a second characteristic circuit-breaker, and a motor for said circuit-breakers, as and for the purpose described.

20. The combination of a closed metallic circuit, including a series of thermostats and a receiving-instrument, a series of circuit-breakers, a motor therefor, and a series of shunts, one around each group of thermostats and each including one of said circuit-breakers, as and for the purpose described.

21. The combination of a closed metallic circuit, including a series of thermostats, a circuit-breaker, and a receiving-instrument, a series of additional circuit-breakers, a motor for all of said circuit-breakers, and a series of shunts, one around each group of thermostats and each including one of said series of circuit-breakers, as and for the purpose described.

22. The combination of a train of gear-wheels, a pin in one of said wheels, a pin in another and slower-moving wheel, a lever having one end adapted to stand normally in the path of said first-mentioned pin, a controlling-magnet and connections between the armature of said magnet and said lever, whereby when the magnet is momentarily energized the lever is moved from the path of said first pin and the train is released, and when the magnet is energized for a longer time the end of the lever is held in the path of the second pin and the train is stopped, substantially as described.

In witness whereof I affix my signature in presence of two witnesses.

JOHN P. McMAHON.

Witnesses:
EDWARD A. GREELEY,
WILLIAM K. ROACH.